UNITED STATES PATENT OFFICE.

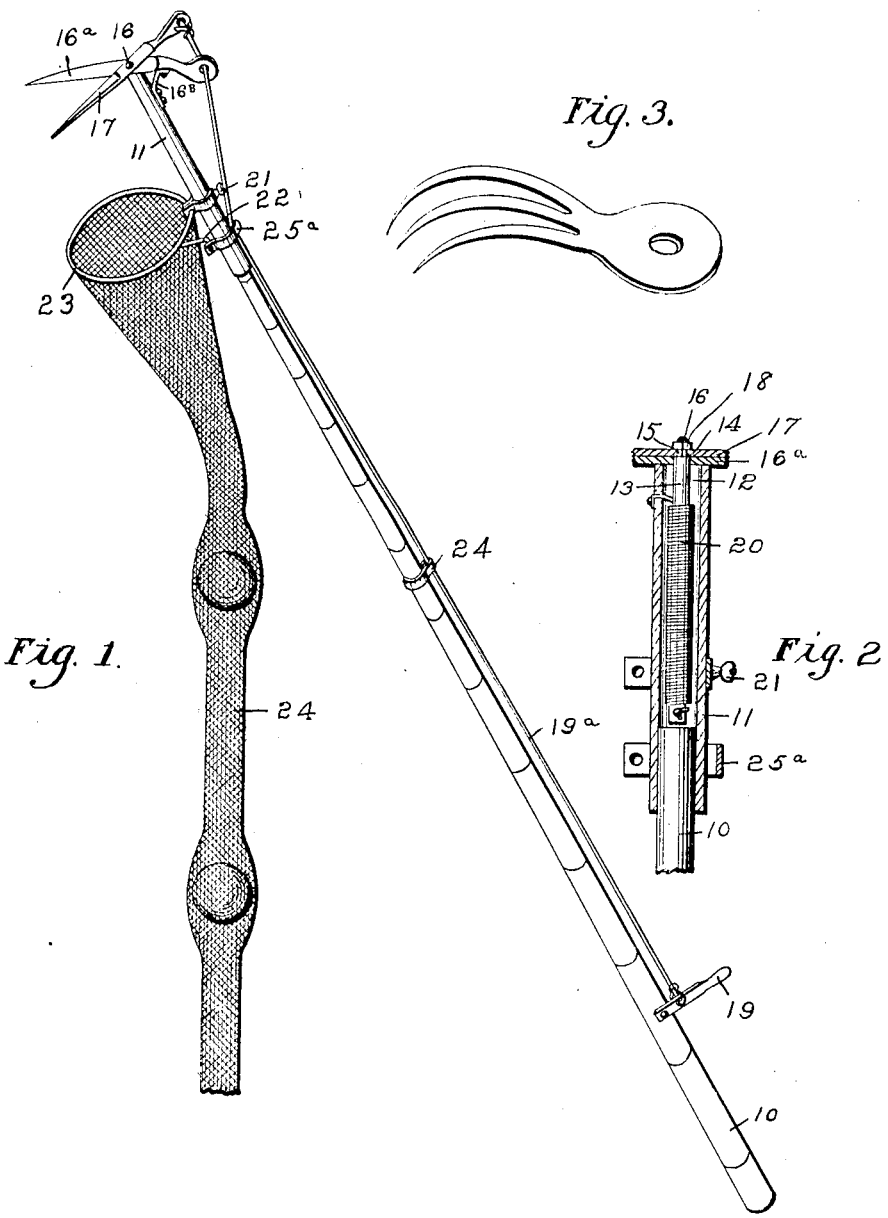

JAMES SHAFER GRIFFIN, OF SAC CITY, IOWA.

FRUIT-PICKER.

No. 906,412.  Specification of Letters Patent.  Patented Dec. 8, 1908.

Application filed February 15, 1908. Serial No. 416,103.

*To all whom it may concern:*

Be it known that I, JAMES S. GRIFFIN, a citizen of the United States, residing at Sac City, in the county of Sac and State of Iowa, have invented a certain new and useful Fruit-Picker, of which the following is a specification.

The object of my invention is to provide a fruit picker of simple and durable construction for use in securing the fruit from the tree quickly and without injury or bruise to it.

My invention consists in certain details in the construction, arrangement and combination of the various parts of the device, whereby the objects contemplated are attained, as hereinafter more fully set forth, pointed out in my claim and illustrated in the accompanying drawings, in which—

Figure 1 is a perspective view of my device, with the chute broken away at its lower end. Fig. 2 is a sectional view of the ferrule, showing the spring for normally maintaining the shears open, in position, and part of the shears in cross section in a closed position, and Fig. 3 is a perspective view of a modified form of mechanism for picking the fruit.

Referring to the accompanying drawings, I have used the reference numeral 10 to designate a pole, to one end of which is securely fitted a ferrule 11. Within the ferrule 11 is a chamber 12, into which is inserted the rotatable rod 13 which projects slightly beyond the open end of the ferrule 11, and has a shoulder 14, a squared portion 15, and a screw threaded portion 16, as is shown in Fig. 2. Upon this rod 13, and resting against the end of the ferrule 11, I mount one blade of the shears 16ª, which is held rigidly in position by the brace 16ᵇ. The other blade of the shears 17, I mount upon the squared portion 15 of the rod 13, letting the blade 17 rest upon the shoulder 14. Both blades are retained in operative adjustment by the retaining nut 18.

Pivoted to a convenient point on the pole 10 is the operating lever 19, to which is attached the operating cord 19ª, which passes from the lever 19 along the pole, through the retaining clamps 24 and 25ª, and through the eye formed in the handle portion of the blade 16ª, to the eye in blade 17, where it is securely fastened, as is clearly shown in Fig. 1.

Within the ferrule 11 and wound about the rod 13 is a coiled spring 20, so disposed as to hold the blades 16ª and 17 of the shears in an open position and to return them thereto, after the blade 16ª is advanced to a closed position by operating pressure upon lever 19.

Adjustably mounted by the clamp 21 and brace 22, near the end of the pole is the chute portion of the device, comprising a loop 23, and a netted tube 24. To provide for the ready adjustment of the mouth portion of the tube 24 with reference to the shears, I provide the clamp 21, with a thumb screw.

In the practical operation of my device, the parts are adjusted substantially as shown in Fig. 1; the shears are slipped over the stem of the fruit, the operating lever 19 pressed downward, and the shears closed, thereby severing the fruit which falls into the tube 24, and is brought gradually to the ground. For picking certain varieties of fruit I provide the form of device shown in Fig. 3.

Having thus described my invention, what I claim and desire to secure by Letters Patent of the United States, therefor is—

An improved fruit picker, comprising a handle, a ferrule on the upper end of the handle, a rod arranged within the ferrule, a coil spring having one end attached to the rod and the other end to the ferrule for turning the rod, a stationary shear blade fixed on top of the ferrule and provided with an eye, a co-acting shear blade fixed to said rod, a nut on the rod to engage the latter mentioned shear blade, said spring and rod being so arranged as to normally open the shear blades, a cord fixed to the upper shear blade and passed through the eye of the handle of the lower or stationary shear blade, guides fixed to the pole and having said cord passed through them, a clamp adjustably fixed to the ferrule, a loop fixed to said clamp at a point below the cutting blades of the shears, and a tube made of woven fabric fixed to said loop for conveying fruit admitted into the upper end thereof to the lower or discharge end thereof.

Des Moines, Iowa, Oct. 17, 1907.

JAMES SHAFER GRIFFIN.

Witnesses:
ANNA E. WILSON,
H. G. WILSON.